United States Patent [19]

Vogel et al.

[11] Patent Number: 5,218,182
[45] Date of Patent: Jun. 8, 1993

[54] CONSTANT CURRENT WELDING POWER SUPPLY WITH AUXILARY POWER SOURCE TO MAINTAIN MINIMUM OUTPUT CURRENT LEVELS

[75] Inventors: Bernard J. Vogel, Troy; Richard G. Shaw, Ludlow Falls, both of Ohio

[73] Assignee: Hobart Brothers Company, Troy, Ohio

[21] Appl. No.: 897,313

[22] Filed: Jun. 11, 1992

[51] Int. Cl.$^5$ .............................................. B23K 9/073
[52] U.S. Cl. .............................................. 219/130.32
[58] Field of Search ........................ 219/130.32, 130.51, 219/137 PS

[56] References Cited

U.S. PATENT DOCUMENTS

| | | | |
|---|---|---|---|
| 3,356,928 | 12/1967 | Parrish | 219/130.32 |
| 3,444,430 | 5/1969 | Needham | 219/130.51 |
| 3,530,359 | 9/1970 | Grist | 219/130.32 |
| 3,792,225 | 2/1974 | Needham et al. | |
| 3,809,853 | 5/1974 | Manz | |
| 4,717,807 | 1/1988 | Parks et al. | |
| 4,866,247 | 9/1989 | Parks et al. | |
| 4,897,522 | 1/1990 | Bilczo et al. | 219/130.32 |
| 4,897,523 | 1/1990 | Parks et al. | |
| 5,001,326 | 3/1991 | Stava | |

*Primary Examiner*—Clifford C. Shaw
*Attorney, Agent, or Firm*—Biebel & French

[57] ABSTRACT

An auxiliary power supply is connected through a fast acting switch to the output of a regulated, constant current welding power supply. A current sensing circuit monitoring the output current level actuates the fast acting switch whenever the current level falls below a predetermined value to insure that a minimum output current level is maintained. The auxiliary power supply is disconnected after the current level rises to a second, higher current level.

4 Claims, 2 Drawing Sheets

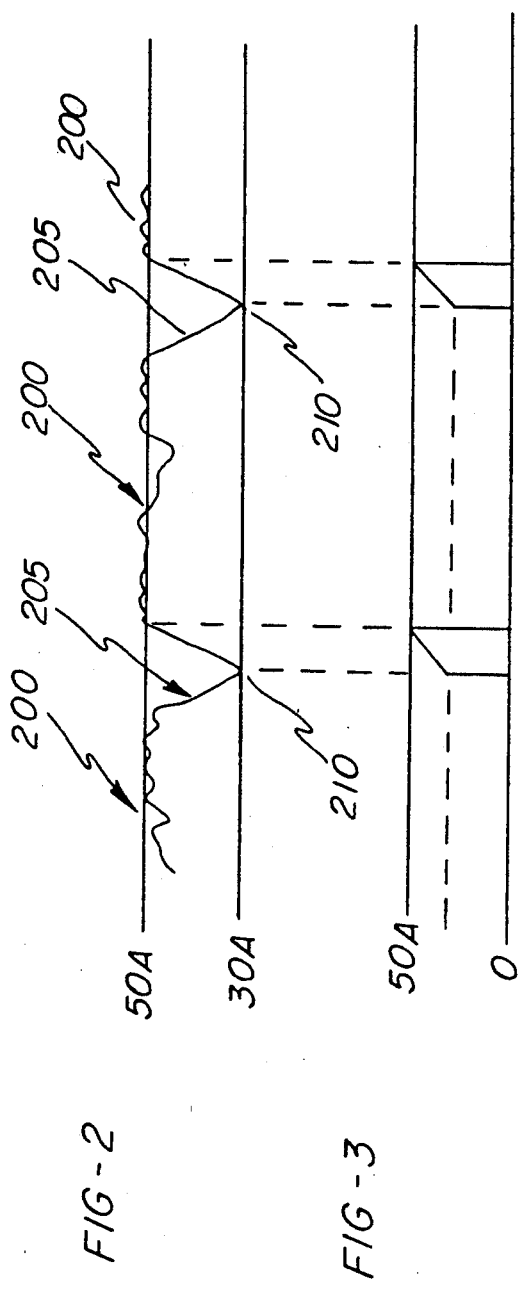

CONSTANT CURRENT WELDING POWER SUPPLY WITH AUXILARY POWER SOURCE TO MAINTAIN MINIMUM OUTPUT CURRENT LEVELS

BACKGROUND OF THE INVENTION

This invention relates to an improved constant current welding power supply, and particularly a high capacity power supply that may be used occasionally in low current welding applications.

High capacity, constant current welding power supplies typically employ an SCR controlled bridge rectifier circuit to control the output current flow in response to a current sensor placed in the lead to the welding electrode. A typical power supply might provide in excess of 200 amperes of output current. SCR controlled bridge rectifiers are not fast acting, particularly when the power supply is being operated in a low power mode (in the order of 50 amperes). Thus, high capacity power supplies have not been suited for use when welding with small diameter electrodes where low power is required because they do not respond quickly enough to large current variations caused by such events as an occasional short circuit, the clearing of short circuits, changes in arc length caused by the operator, or changes in the burn off rate of the electrode. If the current level falls below a predetermined minimum level, for example, 30 amperes, then the arc may be momentarily extinguished, causing undesirable effects.

It is desirable, however, to be able to use a single power supply in multiple applications, and particularly, it is desirable to be able to use a high capacity constant current welding power supply for welding at constant current in low power applications.

SUMMARY OF THE INVENTION

The present invention permits a high capacity constant current welding power supply to be used effectively in low power applications.

Typically a regulated constant current power supply includes an SCR controlled bridge rectifier for providing a constant current output of the type capable of supplying current in excess of 200 amperes. The ability of the power supply to provide a constant current output in the low power, typically 50 ampere range, is enhanced by using, in the present invention, an auxiliary power supply of limited capacity which is connected through a fast acting switch to the output of the main or primary welding power supply.

A current sensing circuit monitoring the output current level actuates the fast acting switch whenever the current level to the welding electrode falls below a predetermined value to insure that a minimum output current level is maintained. The auxiliary power supply is disconnected after the current level rises to a second, higher current level. Thus, the auxiliary power supply may be of simple construction, of inexpensive design, and unregulated, while maintaining a minimum current to the welding electrodes during those times when the SCR rectifier is unable to react quickly enough to sudden changes in conditions at the welding electrode.

It is therefore an object of this invention to provide an auxiliary power supply which may be connected in parallel with a primary power supply to provide a minimum current level during those intervals when the regulation of the primary power supply has not responded quickly enough to maintain a predetermined minimum current level.

It is another object of this invention to provide, in a low amperage constant current welding power supply for supplying arc generating current to welding electrodes including a transformer, an regulated rectifier circuit, a current sensor, and a current regulating circuit for controlling the output current from the regulated rectifier circuit, an improvement comprising a second power source, a fast acting switch connected between said second power source and the welding electrodes, and a current sensing circuit for actuating said fast acting switch when the current to the welding electrodes from said regulated rectifier circuit falls below a predetermined minimum current value and for deactuating said fast acting switch when the current to the welding electrodes rises above a second, higher predetermined current value.

Other objects and advantages of the invention will be apparent from the following description, the accompanying drawings and the appended claims.

BRIEF DESCRIPTION OF THE DRAWINGS

FIG. 2 is a waveform diagram showing the current output of the power supply with the auxiliary power supply of this invention in operation; and FIG. 3 is a waveform diagram showing the output current from the auxiliary power supply.

DESCRIPTION OF THE PREFERRED EMBODIMENT

Figure 1:
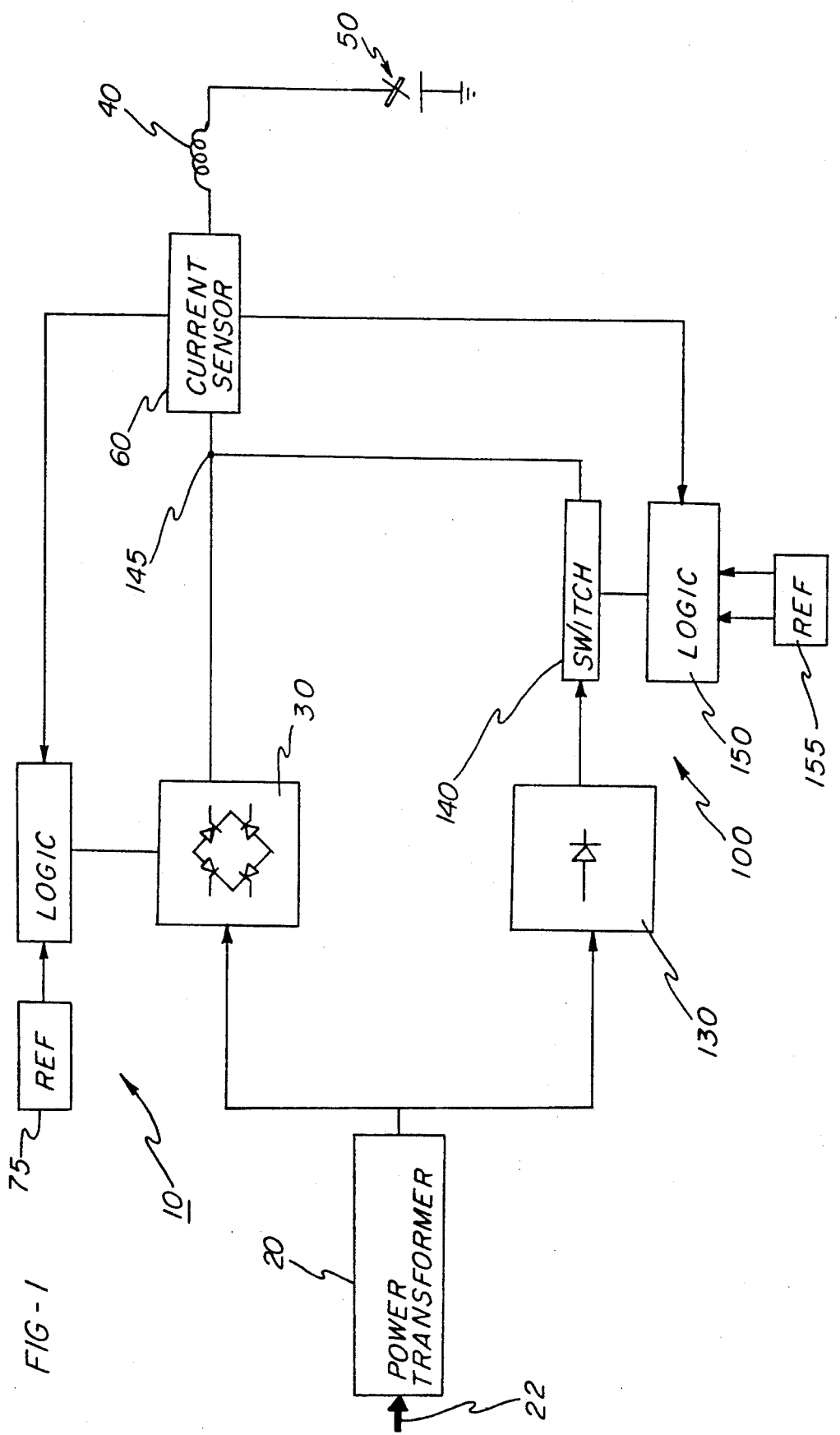
FIG. 1 is an electrical block diagram of a constant current welding power supply constructed according to this invention.

Referring now to the drawings which illustrate a preferred embodiment of the invention, and particularly to the block diagram of FIG. 1, a welding power supply 10 is shown as including a line frequency transformer 20, a rectifier 30, a smoothing inductor 40 and a welding electrode 50.

The transformer 20 is connected to a source of current by means of input lines 22. The current source may be single or three-phase and is typically provided by commercial mains. The output of the power transformer is shown connected to a rectifier circuit 30, which may be controllable to regulate the current flowing to the electrode 50.

The welding electrode 50 is a consumable electrode used in the Shielded Metal Arc Welding process (SMAW) where an arc is maintained between the end of the electrode and the workpiece. As the electrode is consumed, the arc will alternate between a short circuit and a condition where a gap will develop, with the arc bridging the gap. The effective impedance that the output of the power supply sees therefore varies over a wide range as the electrode is consumed. The level of current is maintained in part by the inductor 40, placed in series with the electrode. The inductor also reduces any ripple resulting from the rectification of the alternating current input to the transformer.

Regulation of the output current is also accomplished by controlling the action of the rectifier 30 by a current regulating circuit. The rectifier circuit 30 may include a bridge of SCRs or thyristors which conduct for a controlled portion of each alternating current cycle in response to the actual current flowing to the electrode. A current sensor 60 is place in series with the inductor 40, and the output from this device represents the current value which is used by a logic circuit 70 to control the firing angle of each SCR in the bridge to maintain the current a some value, as defined by a reference 75. This reference may be constant or changing, depending on the desired welding parameters.

When the welding power supply 10 is used in low current applications, an auxiliary power supply 100 is provided in accordance with the teachings of this invention. Power to the auxiliary power supply may be provided by the line transformer 20, or it may be provided by a separate transformer. A rectifier 130 converts the alternating current output of the transformer into direct current and applied to a fast acting switch 140. The rectifier may be full or half wave and may be regulated but is preferably unregulated to reduce expense.

The output of the switch 140 is connected at 145 to the output of the rectifier 30 of the main power supply. The switch in the preferred embodiment is a fast acting transistor, such as a type IGBT transistor, for example, a Toshiba GT60M101 transistor, which is capable of switching up to 50 amperes of current in this application.

The operation of switch 140 is controlled by a current sensing circuit including logic circuit 150 which is also provide with information regarding the level of current flowing to the welding electrode by current sensor 60. Of course, it will be understood that a separate current sensor could be provide, if desired. Logic circuit 150 is provided with reference inputs by reference source 155.

The current sensing circuit will actuate the fast acting switch 140 when the current to the welding electrodes from said regulated rectifier circuit 30 falls below a predetermined minimum current value and will deactuate the fast acting switch when the current to the welding electrodes rises above a second, higher predetermined current value. In this way, a minimum level of current is provided to the electrode 50 during those times when the regulated rectifier circuit is unable to respond quickly enough to sudden reductions in current level.

By way of example, and referring to the waveform diagrams of FIGS. 2 and 3, if the desired output current from the power supply is a predetermined value of say 50 amperes, the regions 200 in the waveform of FIG. 2 shows that the main power supply will attempt to regulate the current flow at that level. However, there will occasionally be sudden changes at the arc that will cause the current flow to drop, as shown at 205. Because of the nature of the regulated power supply 10, it may take some time before full current can be established by that power supply.

If the current level falls to a second predetermined value of 30 amperes, (at 210 in FIG. 2) then the logic circuit 150 will detect that event and will cause the fast acting switch 140 to close, connecting the output of rectifier 130 of auxiliary power supply 100 to the welding electrode and preventing an arc outage.

As shown in FIG. 3, when the current through the sensor 60 falls to 30 amperes, the switch 140 closes, and the output of the auxiliary power supply is immediately at 30 amperes and then ramps up to 50 amperes, the desired current level, at which time the switch 140 is deactuated or opened, allowing the main power supply to continue its regulation until the next time the current level falls.

Thus, the auxiliary power supply 100 is only in the circuit momentarily to provide a source of current and to maintain a minimum current flow to the electrode and thereby prevent arc outages.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a low amperage constant current welding power supply for supplying arc generating current to welding electrodes including a transformer, an regulated rectifier circuit, a current sensor, and a current regulating circuit for controlling the output current from the regulated rectifier circuit, the improvement comprising
   a second power source,
   a fast acting switch connected between said second power source and the welding electrodes, and
   a current sensing circuit for actuating said fast acting switch when the current to the welding electrodes from said regulated rectifier circuit falls below a predetermined minimum current value and for deactuating said fast acting switch when the current to the welding electrodes rises above a second, higher predetermined current value.

2. The power supply of claim 1 wherein said second power source is an unregulated power supply with a rising current versus time output.

3. A welding power supply for supplying arc generating current to welding electrodes including
   a power transformer having an input connected to a source of power, and an output,
   a regulated rectifier circuit connected to said transformer output,
   a current sensor for sensing the actual current flowing from said regulated rectifier circuit to the welding electrodes,
   a current regulating circuit for controlling the output current from the regulated rectifier circuit in response to said current sensor and a preselected reference,
   a second rectifier circuit having an output connected in parallel with regulated rectifier circuit,
   a fast acting switch connected between said second rectifier circuit and the welding electrodes, and
   a current sensing circuit for actuating said fast acting switch when the current to the welding electrodes from said regulated rectifier circuit falls below a predetermined minimum current value and for deactuating said fast acting switch when the current to the welding electrodes rises above a second, higher predetermined current value thereby to provide a minimum level of current during those times when said regulated rectifier circuit is unable to respond quickly enough to sudden reductions in current level.

4. The welding power supply of claim 3 wherein said regulated rectifier circuit is an SCR bridge circuit.

* * * * *